(No Model.)

C. HARNDEN.
DENTAL MOUTH MIRROR.

No. 606,456. Patented June 28, 1898.

WITNESSES:
P. F. Eagle.
L. Douville.

INVENTOR
Charles Harnden
BY
Diedersheim + Fairbanks
ATTORNEYS.

UNITED STATES PATENT OFFICE.

CHARLES HARNDEN, OF BOWMANVILLE, CANADA, ASSIGNOR TO JAMES W. IVORY, OF PHILADELPHIA, PENNSYLVANIA.

DENTAL MOUTH-MIRROR.

SPECIFICATION forming part of Letters Patent No. 606,456, dated June 28, 1898.

Application filed June 1, 1896. Serial No. 593,889. (No model.)

*To all whom it may concern:*

Be it known that I, CHARLES HARNDEN, a subject of Her Majesty Queen Victoria, and a resident of the town of Bowmanville, in the Province of Ontario, Dominion of Canada, have invented certain new and useful Improvements in Dental Mouth-Mirrors, of which the following is an exact description.

My invention consists of a novel construction of dental mouth-mirror, as hereinafter described and claimed.

Figure 1:
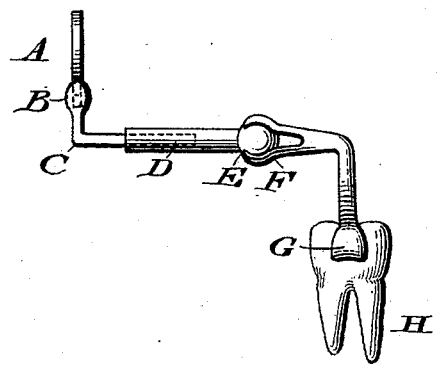
Figure 2:
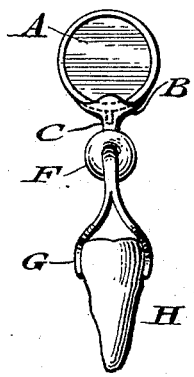

In the drawings which form a part of this specification, Figure 1 represents a side view of a dental mouth-mirror embodying my invention. Fig. 2 represents a front view of the device shown in Fig. 1.

Similar letters indicate like parts in both figures.

Referring to the drawings, A designates a reflector of any suitable form, having the angular arm or bracket C rigidly secured thereto at B. The horizontal limb of the said arm C slides in a sleeve D, which has connected with it at one end thereof the ball E, said ball being adjustable within the spring-socket F, so as to permit the adjustment of the sleeve D and bracket C with the mirror A in any position within the mouth.

The socket F is provided with a spring-clamp G, integral therewith, by which it may be readily secured to the crown of a tooth H. The clamp G is bent so that the opening in the socket F extends horizontally.

It will be seen that the device as described is simple in construction and enables the operator to easily inspect the condition of the rear portion of the teeth in the mouth in which it is inserted without the need of the aid of an assistant.

I am aware that it is old to construct a dental tooth-mirror which is capable of annular adjustment in reference to a clamp which may be secured to a tooth, and also that it is old to form a spring-clamp for such purposes with an upper bent part; but such features I do not broadly claim, but in my case I employ a spring-clamp having a bent or angular arm, which latter is provided with a spring-socket to receive a ball on the end of a sleeve in which is adjustably fitted an arm of the bracket to which the mirror is attached.

Having thus described my invention, what I desire to claim and protect by Letters Patent is—

A dental mouth-mirror consisting of the reflector A, the angular bracket B, having said reflector A secured to one of its limbs, the sleeve D in which the horizontal limb of said bracket is adjusted, and which is provided at one end with the ball E, the spring-clamp G adapted to be secured to a tooth, and having a bent upper end and a spring-socket, the latter inclosing the ball E.

Bowmanville, May 28, 1896.

CHARLES HARNDEN.

Witnesses:
JOHN BERNARD MITCHEL,
ALEXANDER KENNEDY.